May 19, 1925.  R. T. HAZELTON  1,538,853
BELT GUARD
Filed Aug. 1, 1924    2 Sheets-Sheet 2

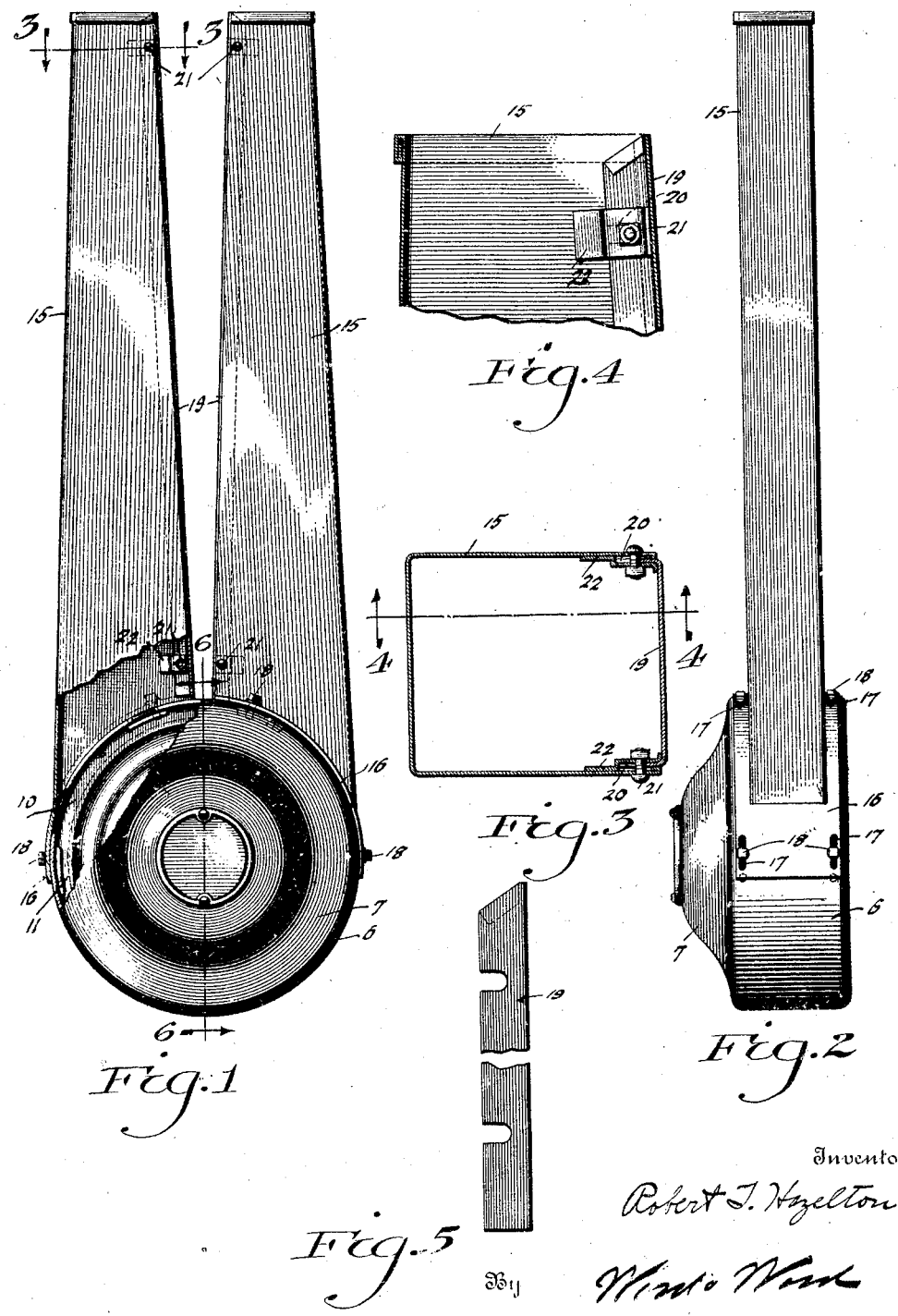

Inventor
Robert T. Hazelton

Attorneys

Patented May 19, 1925.

1,538,853

UNITED STATES PATENT OFFICE.

ROBERT T. HAZELTON, OF CINCINNATI, OHIO, ASSIGNOR TO THE CINCINNATI SHAPER COMPANY, OF CINCINNATI, OHIO, A CORPORATION OF OHIO.

BELT GUARD.

Application filed August 1, 1924. Serial No. 729,621.

*To all whom it may concern:*

Be it known that I, ROBERT T. HAZELTON, a citizen of the United States, and residing at Cincinnati, in the county of Hamilton and State of Ohio, have invented a new and useful Improvement in Belt Guards, of which the following specification is a full disclosure.

This invention relates to improvements in pulley and belt housings and has for an object to provide a device of this character having a main hollow body portion for enclosing a pulley, and having adjustable substantially radially extending housing members or legs adapted to receive the belt runs of the pulley and further adapted to be angularly adjustable conformably to the angular relation of the runs to the pulley, whatever their divergent or convergent disposition.

Another object of the invention is to provide a device of the above character which can be detachably secured to the support upon which the pulley shaft is mounted, and in which the pulley housing portion may be rotated through any angle concentrically with the pulley shaft, according to the dispostion of the belt runs.

Another object is to provide radially extending and adjustable casing members for housing the belt runs and to provide means for clamping the casings upon the pulley housing in any desired angular relation over and circumferentially of the housing and of a circumferential opening in said housing, the adjustable leg-like members forming a continuation of the pulley enclosing chamber.

Another object of the invention is to provide substantially radially extending belt run housings having removable sides opposingly related in such manner that when in use for a belt with straight runs, the said runs are individually housed, and whereby for a twisted belt the sides may be removed and the casings brought together to form a relatively larger continuous chamber about the belt run, as a continuation of the hollow enclosing chamber.

The device as a unit can be conveniently detached and adjusted conformable to various types of installation and provides means whereby the belts and pulleys are properly protectively housed.

Other objects and certain advantages will be more fully set forth in the description of the accompanying drawings forming a part of this specification, in which:

Figure 1 is a side elevation of my improved belt housing, a portion of the wall of the same being broken away to more clearly show the relation of one of the adjustable members to the pulley housing.

Figure 2 is a side elevation of Figure 1.

Figure 3 is a section through one of the leg-like casings on line 3—3, of Fig. 1, showing the manner of attaching its removable side.

Figure 4 is a section on line 4—4, of Fig. 3, showing the arrangement of the attaching clip relative to the longitudinal flange of the removable side.

Figure 5 is a fragmentary edge view of one of the trough-like removable sides.

Figure 6:
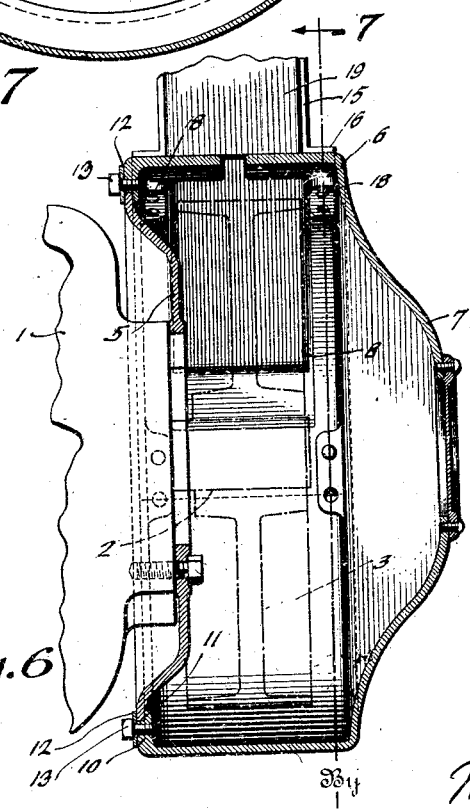
Figure 6 is a vertical sectional view through the main casing or pulley housing member taken on line 6—6, of Fig. 1.

The numeral 1 designates any suitable support such as a bearing in which is suitably journaled a shaft 2, shown in Fig. 6, and upon which shaft is mounted a suitable pulley 3, the shaft and pulley being indicated in dot-and-dash lines. The pulley, and belt runs associated therewith, are adapted to be enclosed and housed by my improved device. Attached to the base 1 is a disk-like member 5 having a central circular opening through which the pulley shaft projects, the said member being inwardly dished, as shown, and attached by screws to the base. Mounted rotatably and adjustably on the disk is a pulley housing 6 of substantially hollow cylindrical form having one closed side 7, in this instance of curvilinear configuration cross-sectionally, said closed side being centrally provided with an opening closed by a cover, removable for obtaining access to the bearing for oiling or like purposes. The casing is moreover provided with a relatively wide arcuate peripheral slot 8 extending approximately through an angle of 180°, of a width less than that of the flat circumferential side of the housing, and adapted to permit the belt runs to pass into the casing and around the pulley therewithin. The central portion of the slot is in this instance narrowed, by projecting portions of the casing inwardly, for the purpose of preventing the entrance of dust when the arms are adjusted at a relatively wide angle. Two slots spaced at each side of the vertical center of the housing, one for each leg, could, however, be provided, or a single slot of equal width. The casing on the opposite flat side is provided with a relatively narrow inturned circumferential flange 10 having in its outer surface adjacent its inner edge a circular seat 11 formed by grooving or notching, and this seat is fitted over the periphery of the inwardly dished cover 5, and said housing is held rotatably and adjustably thereon by means of washers and bolts, 12, 13. The washers form with the circumferential notch, a groove, and the washers also act as clamping devices for holding the housing in adjusted position upon the support 5. The housing 6 is thus rotatable to permit proper adjustment in any degree, and after adjustment the casing is locked by means of the bolts and washers.

Figure 7:
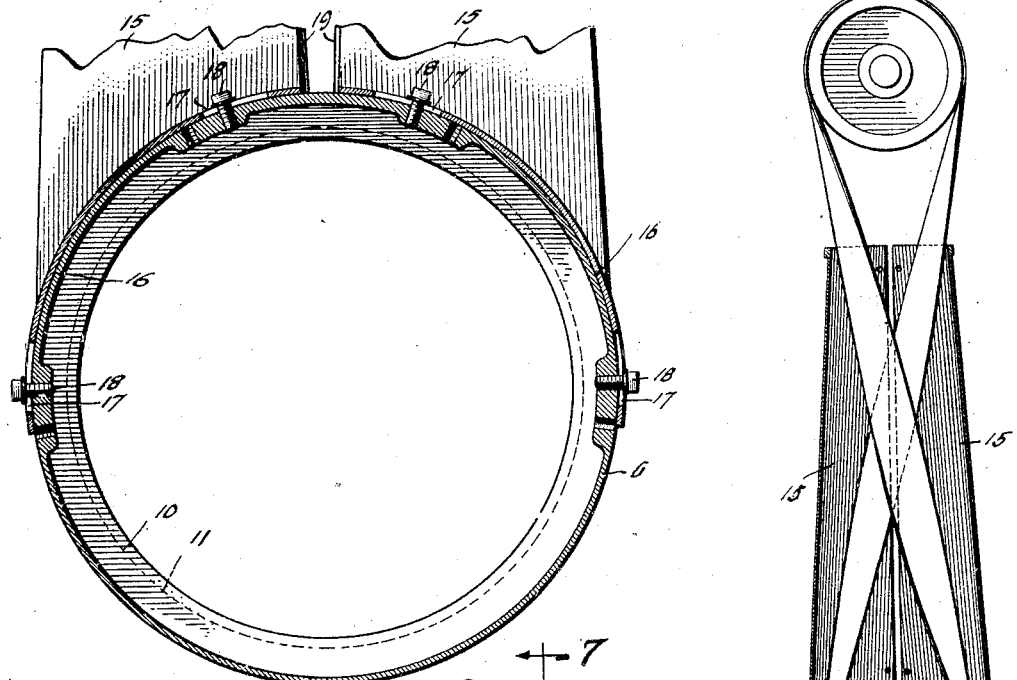
Figure 7 is a vertical section on line 7—7, of Fig. 6, showing the relations of the flanges of the radially adjustable casing members and of the securing and clamping devices therefor.

In order to provide for the housing of the belt runs both for the ordinary straight runs and for crossed-runs, I provided two hollow preferably rectangular casing or boot sections, mounted exteriorly as extensions of the drum, substantially radially, said casings being adjustable toward and away from one another. Each casing or boot section 15 is provided with a curved attaching plate 16, as a circular segment adapted to engage flatly against and conform to the configuration of the flat circular portion of the pulley housing, the flanges at each side being provided with a pair of circumferentially aligned elongated slots 17 through which are passed clamping retaining screws 18 in threaded connection with the main housing as best shown in Fig. 7. Pairs of aligned circumferential radial threaded openings are provided in the main housing with either of which the clamping screw may be engaged conformable to the required angular adjustment between the casing members and housing.

The casings are identical in structure and are interchangeable and each is preferably permanently closed on three sides and has a removable fourth side, these removable sides of the casings being opposingly related as best shown in Fig. 1. The removable sides 19 are preferably formed of sheet metal having inturned longitudinally disposed parallel flanges, the sides having hollow trough-like form.

Each flange has two slots 20 at relatively opposite ends extending inwardly from the inner edge of the flange for engagement over clamping bolts 21. Clips 22 are provided which lie against the inner side of the flanges and corresponding wall of the casing through which the bolts 21 are passed to retain the clips, and clamp clips, flanges and side walls together.

As herein constructed the removable walls of the casing are substantially radial with respect to the shaft and housing axes and the corresponding outer walls are substantially tangent to the periphery of the pulley housing while the other side walls are parallel, as shown in Fig. 2. The removable wall and the opposingly related wall are, therefore, outwardly convergently related.

Figure 8:
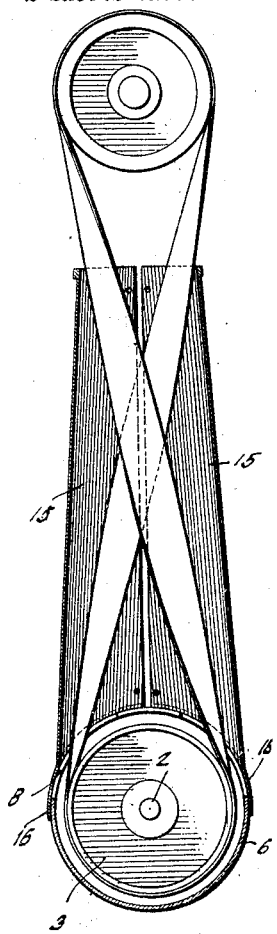
Figure 8 is a vertical section, the removable sides being detached and the casings brought together to form a single chamber for enclosing a twisted belt.

In Fig. 1 the leg-like casings are arranged to receive straight belt runs, while in Fig. 8 the sides have been removed and the legs brought together to form a single casing of larger dimensions capable of enclosing the runs or cross-belt.

It is obvious that various minor changes could be made such as modifying the structure for rotatably attaching the cylindrical housing to its support, the principal utility of the device residing in its adjustability to suit varying conditions of belt assembly.

The arcuate slots of the belt housing with which the inner open ends of the adjustable casings communicate and bridge or cover, could be entirely closed at a central point. Moreover, the slots in the flanges of the adjustable radial casings could be modified and the range of adjustment increased or descreased as desired.

Having described my invention, I claim:

1. In a device of the class described, a cylindrical drum having an arcuate slot in its circumferential wall, and an opening in one of its end walls, a pair of rectangular open end casings adjustably attached exteriorly of and to the drum, the inner opposing walls of said casings being radial to the drum axis and removably attached and the corresponding opposite walls substantially tangent to the drum circumference whereby when the removable sides of the casings are detached the casings can be brought together to form a single chamber communicating with the interior of the drum, and whereby when the removable sides are in place the casings form separate housings each communicating with the interior of the drum.

2. In a device of the class described, a hollow cylindrical drum having an arcuate circumferential slot in its circular side and having a circumferential end flange provided with a circumferential groove, a circular closure and attachment plate rotatably secured within the groove, means for clamping the plate and housing together, adapting the drum to be rotatably attached to a support, and two casings exterior of the drum extending therefrom, each having a removable side, said sides opposingly related, said casings circumferentially adjustable upon said drum over said slot, and means for clamping the casings in adjusted position.

3. In a device of the class described, a circular housing adapted to be rotatably attached to a support and having a circumferential arcuate slot in its circular side, a pair of hollow casings extending from the housing overlying and in registry with the slot, each having a removable side wall, said walls opposingly related, said casings adapted to be angularly adjusted toward and away from each other and further adapted to be brought together to form a single chamber, when said side walls are removed.

4. A stationary cylindrical casing adapted to house a pulley and further adapted for adjustable attachment to a support concentric with the pulley axis, said casing having an arcuate opening circumferentially thereof, hollow rectangular housing sections mounted exteriorly of the casing and slidable thereon, disposed over and communicating with said arcuate opening extending radially from the drum and adjustable circumferentially thereon toward and away from one another, each section having a removable side, said sides opposingly related adapting the casings to be angularly adjusted, conformably to the angular relations of the belt runs, and further adapting them to be brought together and combined to form a single chamber of relatively large dimensions after removal of the said side members for housing the runs of a twisted belt.

5. In a device of the class described, a drum member having an arcuate opening in one portion of its circular wall, means for adjustably attaching the drum about an axis, hollow rectangular housing sections mounted exteriorly of the drum extending therefrom and adjustable toward and away from one another to provide housings for each belt run and further adapted to be brought together to form a single chamber of relative large dimension.

6. A pulley and belt guard comprising a drum adapted to enclose a pulley and provided with an opening for passing a belt and boot sections opposingly arranged and extending from the periphery of the drum for individually housing the runs of a belt engaged about the pulley housed by said drum, said boot sections adjustable upon the drum toward each other to unite the same into a single unit.

In witness whereof, I hereunto subscribe my name.

ROBERT T. HAZELTON.